US011148595B2

(12) United States Patent
Kondo et al.

(10) Patent No.: US 11,148,595 B2
(45) Date of Patent: Oct. 19, 2021

(54) IMAGE OUTPUT DEVICE, AND NON-TRANSITORY TANGIBLE COMPUTER-READABLE MEDIUM FOR OUTPUTTING IMAGE AROUND VEHICLE TO DISPLAY DEVICE

(71) Applicant: DENSO CORPORATION, Kariya (JP)

(72) Inventors: Katsuhiko Kondo, Nisshin (JP);
Yusuke Akamine, Nisshin (JP);
Yasuyuki Miyake, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/801,535

(22) Filed: Feb. 26, 2020

(65) Prior Publication Data
US 2020/0189467 A1    Jun. 18, 2020

Related U.S. Application Data

(63) Continuation of application No. PCT/JP2018/026042, filed on Jul. 10, 2018.

(30) Foreign Application Priority Data

Aug. 28, 2017  (JP) .............................. JP2017-163622

(51) Int. Cl.
*B60R 1/00*     (2006.01)
*G01S 13/62*    (2006.01)
(Continued)

(52) U.S. Cl.
CPC .............. *B60R 1/002* (2013.01); *G01S 13/62* (2013.01); *G01S 13/72* (2013.01); *G01S 13/867* (2013.01);
(Continued)

(58) Field of Classification Search
None
See application file for complete search history.

(56) References Cited

U.S. PATENT DOCUMENTS 7,190,282 B2*  3/2007  Maemura .................. B60R 1/00
                                                         340/435
8,655,019 B2*  2/2014  Kamiyama ........... G06T 3/4038
                                                         382/103
(Continued)

FOREIGN PATENT DOCUMENTS

JP    2001-101566 A    4/2001
JP    2004-114709 A    8/2005
(Continued)

OTHER PUBLICATIONS

Koichiro Suzuki and Naoki Hashimoto. 2012. Semi-transparent vision fordriving assistance. In Proceedings of the 11th ACM SIGGRAPH International Conference on Virtual-Reality Continuum and its Applications in Industry (VRCAI '12). Association for Computing Machinery, New York, NY, USA, 99-102. (Year: 2012).*

(Continued)

*Primary Examiner* — Stefan Gadomski
(74) *Attorney, Agent, or Firm* — Maschoff Brennan

(57) ABSTRACT

An image output device outputs a periphery image of a vehicle to a display; acquires a capture image of the periphery; acquires detection information of the periphery; determines an accuracy factor of detection of each object; calculates a position of the object in the capture image; determines whether objects overlap with each other in the capture image; and sets an image transmission region to at least a part of a region displaying a first object disposed on a near side among the objects determined to overlap with each other in the capture image, generates the periphery image for visually confirming a second object disposed on a (Continued)

far side of the first object, and changes a transmittance defined in the image transmission region higher as the accuracy factor of the detection of the second object is higher.

17 Claims, 8 Drawing Sheets

(51) Int. Cl.
```
G01S 13/72      (2006.01)
G01S 13/86      (2006.01)
G06K 9/00       (2006.01)
G06T 11/00      (2006.01)
H04N 7/18       (2006.01)
```
(52) U.S. Cl.
CPC .......... *G06K 9/00805* (2013.01); *G06T 11/00* (2013.01); *H04N 7/18* (2013.01); *B60R 2300/105* (2013.01); *B60R 2300/205* (2013.01); *B60R 2300/301* (2013.01); *B60R 2300/304* (2013.01)

(56) References Cited

U.S. PATENT DOCUMENTS

| | | | | |
|---|---|---|---|---|
| 8,878,934 B2* | 11/2014 | Ikeda | ............... | B62D 15/028 348/148 |
| 8,947,219 B2* | 2/2015 | Popovic | ............... | B60Q 9/008 340/438 |
| 9,073,483 B2* | 7/2015 | Ikeda | ............... | G06K 9/00805 |
| 9,097,800 B1* | 8/2015 | Zhu | ............... | G01S 7/4802 |
| 9,669,761 B2* | 6/2017 | Lee | ............... | B60R 1/00 |
| 9,672,432 B2* | 6/2017 | Yamamoto | ............... | G06T 11/001 |
| 9,852,334 B2* | 12/2017 | Goto | ............... | G06K 9/00369 |
| 2006/0078224 A1* | 4/2006 | Hirosawa | ............... | H04N 5/2353 382/284 |
| 2006/0192660 A1* | 8/2006 | Watanabe | ............... | B60R 1/00 340/435 |
| 2007/0053551 A1* | 3/2007 | Kubo | ............... | G06K 9/00805 382/106 |
| 2007/0146196 A1* | 6/2007 | Oka | ............... | G01S 7/4004 342/70 |
| 2009/0005961 A1* | 1/2009 | Grabowski | ............... | G02B 27/01 701/532 |
| 2009/0102858 A1* | 4/2009 | Eggers | ............... | G06K 9/00805 345/617 |
| 2009/0237269 A1 | 9/2009 | Okugi et al. | | |
| 2011/0298988 A1 | 12/2011 | Kawai | | |
| 2012/0113261 A1* | 5/2012 | Satoh | ............... | G06T 11/00 348/148 |
| 2012/0268262 A1* | 10/2012 | Popovic | ............... | G08G 1/166 340/438 |
| 2012/0327238 A1* | 12/2012 | Satoh | ............... | G08G 1/167 348/148 |
| 2013/0063601 A1* | 3/2013 | Wakabayashi | ............ | B60R 1/00 348/148 |
| 2013/0245877 A1* | 9/2013 | Ferguson | ............... | G08G 1/167 701/23 |
| 2014/0063197 A1* | 3/2014 | Yamamoto | ............ | G06T 15/205 348/46 |
| 2014/0222277 A1* | 8/2014 | Tsimhoni | ............... | B60K 35/00 701/23 |
| 2014/0333729 A1* | 11/2014 | Pflug | ............... | G06T 15/20 348/47 |
| 2015/0203036 A1* | 7/2015 | Kajiwara | ............... | B60R 1/00 345/7 |
| 2015/0220793 A1* | 8/2015 | Kiyohara | ............ | G06K 9/00791 382/103 |
| 2015/0324652 A1* | 11/2015 | Mizutani | ............... | G01S 13/931 382/103 |
| 2016/0124225 A1* | 5/2016 | Kwak | ............... | B60R 11/04 348/115 |
| 2017/0337431 A1* | 11/2017 | Yang | ............... | G06K 9/00771 |
| 2017/0363717 A1* | 12/2017 | Ishimori | ............... | G01S 13/931 |
| 2019/0126824 A1* | 5/2019 | Oba | ............... | H04N 21/4316 |
| 2019/0248288 A1* | 8/2019 | Oba | ............... | G06T 3/0006 |
| 2019/0378255 A1* | 12/2019 | Taya | ............... | H04N 5/23232 |
| 2020/0035207 A1* | 1/2020 | Maruoka | ............... | G09G 5/38 |
| 2020/0302657 A1* | 9/2020 | Shimazu | ............... | B60R 1/00 |

FOREIGN PATENT DOCUMENTS

| | | |
|---|---|---|
| JP | 2009-214831 A | 9/2009 |
| JP | 2009-231937 A | 10/2009 |
| JP | 2013-54496 A | 3/2013 |
| JP | 5624370 A | 11/2014 |
| JP | 2014-229100 A | 12/2014 |
| JP | 2014-229101 A | 12/2014 |
| JP | 2014-229102 A | 12/2014 |
| JP | 6136564 B2 * | 5/2017 |

OTHER PUBLICATIONS

C. Lin, Y. Lin, L. Chen and Y. Wang, "Front Vehicle Blind SpotTranslucentization Based on Augmented Reality," 2013 IEEE 78th Vehicular Technology Conference (VTC Fall), Las Vegas, NV, USA, 2013, pp. 1-6. (Year: 2013).*

Mori, S., Ikeda, S. & Saito, H. A survey of diminished reality: Techniques for visually concealing, eliminating, and seeing through real objects. IPSJ T Comput Vis Appl 9, 17 (2017). https://doi.org/10.1186/S41074-017-0028-1 (Year: 2017).*

* cited by examiner

IMAGE OUTPUT DEVICE, AND NON-TRANSITORY TANGIBLE COMPUTER-READABLE MEDIUM FOR OUTPUTTING IMAGE AROUND VEHICLE TO DISPLAY DEVICE

CROSS REFERENCE TO RELATED APPLICATION

The present application is a continuation application of International Patent Application No. PCT/JP2018/026042 filed on Jul. 10, 2018, which designated the U.S. and claims the benefit of priority from Japanese Patent Application No. 2017-163622 filed on Aug. 28, 2017. The entire disclosures of all of the above applications are incorporated herein by reference.

TECHNICAL FIELD

The present disclosure relates to an image output device for outputting an image around a vehicle to a display device and a non-transitory tangible computer-readable medium.

BACKGROUND

Conventionally, for example, a surrounding monitoring device for a vehicle displays a video image of a monitoring camera that images a front of the vehicle on an image display monitor. The surrounding monitoring device generates a virtual image in which a part of an obstruction is made semi-transparent, for example, when another vehicle is present on a far side of the obstruction. The obstruction on a near side is made semi-transparent, thereby being capable of confirming another vehicle on a far side in the virtual image.

SUMMARY

According to an example, an image output device outputs a periphery image of a vehicle to a display; acquires a capture image of the periphery; acquires detection information of the periphery; determines an accuracy factor of detection of each object; calculates a position of the object in the capture image; determines whether objects overlap with each other in the capture image; and sets an image transmission region to at least a part of a region displaying a first object disposed on a near side among the objects determined to overlap with each other in the capture image, generates the periphery image for visually confirming a second object disposed on a far side of the first object, and changes a transmittance defined in the image transmission region higher as the accuracy factor of the detection of the second object is higher.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
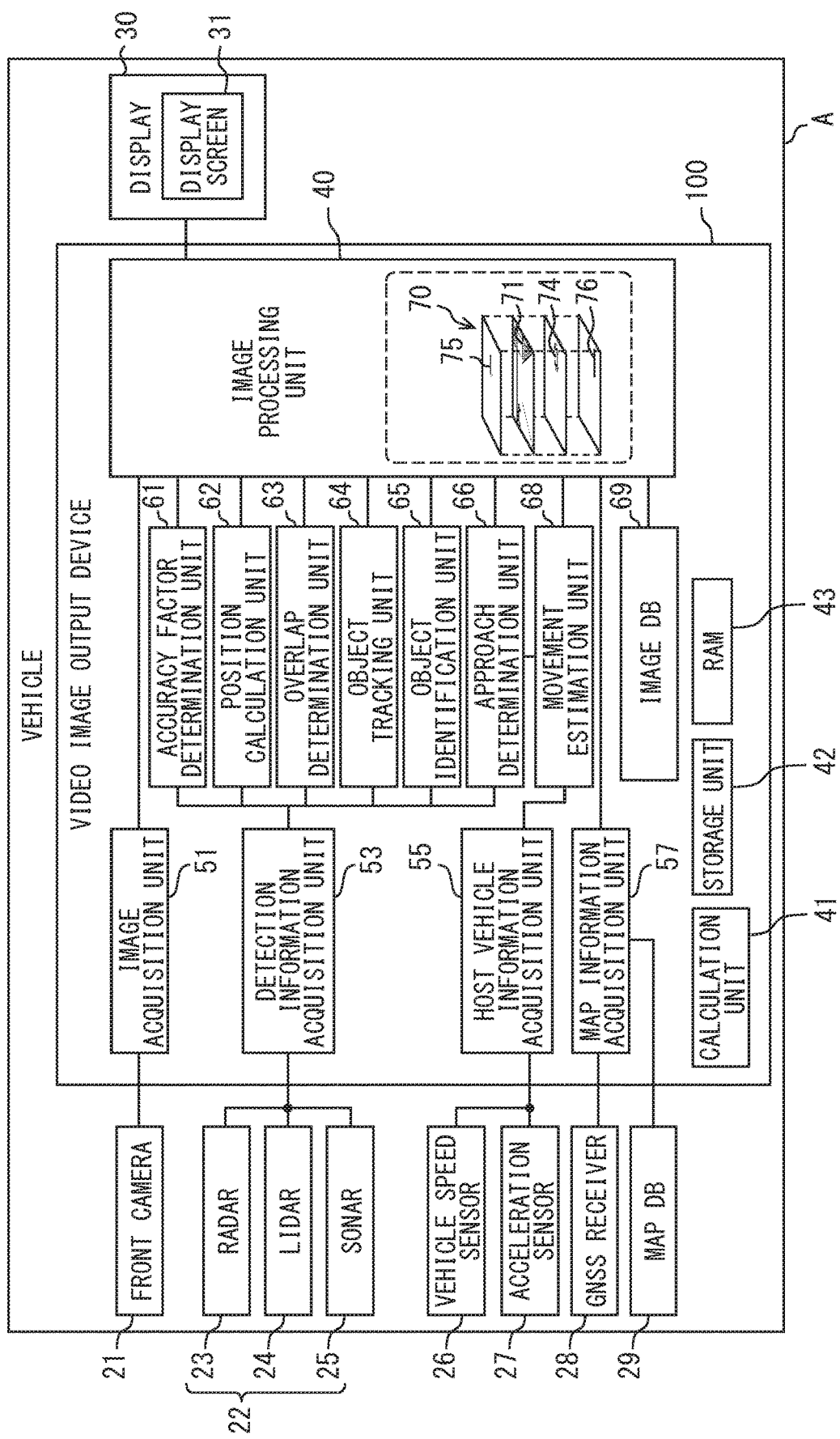
FIG. 1 is a block diagram showing an overall image of an electric configuration mounted on a vehicle.

In general, the detection of an object such as another vehicle is determined when a accuracy factor exceeds a predetermined threshold. Therefore, in a conceivable surrounding monitoring device, a virtual image in which the obstruction is made semi-transparent is displayed after waiting for the detection of another vehicle to be confirmed. This makes it difficult to start the notification of another vehicle at an early stage. If the notification is started at a timing before the determination of the detection of another vehicle, when the detection information is erroneous, the virtual image that erroneously notifies another vehicle may be a cumbersome presentation for a viewer.

An image output device, an image generation program, and a non-transitory tangible computer-readable recording medium capable of promptly notifying an object located on a far side while inhibiting troublesomeness of an image are provided.

According to an example embodiment, an image output device that outputs an image of the periphery of a vehicle to a display device in the vehicle having an imaging unit that images the periphery of the vehicle and a detection unit that is installed in a traveling direction of the vehicle from the imaging unit and detects an object in the periphery of the vehicle, includes: an image acquisition unit that acquires a captured image of the periphery which is captured by the imaging unit; a detection information acquisition unit that acquires detection information of the object detected by the detection unit; a accuracy factor determination unit that determines a accuracy factor of the detection of the object based on the detection information; a position calculation unit that calculates a position of the object in the captured image based on the detection information; an overlap determination unit that determines whether objects overlap with each other in the captured image based on a calculation result of the position calculation unit; and an image processing unit that sets an image transmission region in at least a part of a region displaying a first object present on a near side among a plurality of objects determined to overlap with each other in the captured image, generates an image capable of confirming a second object present on a far side of the first object, and changes a transmittance defined in the image transmission region higher as the accuracy factor of the detection of the second object is higher.

According to the image output device described above, even when the accuracy factor of the detection of the second object is low, in the image of the display device, the image transmission region in which the transmittance is defined can be set in at least a part of the region in which the first object present on the near side is displayed. Therefore, the image of the display device is in a state in which the second object existing on the far side of the first object can be confirmed. If the transmittance defined in the image transmission region is defined to be low at a stage where the accuracy factor is low, an image portion reflecting the second object is displayed in an inconspicuous manner. In addition, the accuracy factor of the detection of the second object is intuitively indicated to the viewer at a transmittance defined in the image transmission region. According to the above configuration, even if the second object is erroneously displayed at an early stage in which the accuracy factor is low, the viewer hardly feels troublesome in the erroneous display. This makes it possible to early notify the second object present on the far side while inhibiting the troublesomeness of the image.

According to an example embodiment, an image generation program that generates a image of the periphery of the vehicle to be output to a display device in a vehicle having an imaging unit that images the periphery of the vehicle and a detection unit that is installed in a traveling direction of the vehicle from the imaging unit and detects an object in the periphery of the vehicle causes at least one processor to function as: an image acquisition unit that acquires a captured image of the periphery which is captured by the imaging unit; a detection information acquisition unit that acquires detection information of the object detected by the detection unit; a accuracy factor determination unit that determines a accuracy factor of the detection of the object based on the detection information; a position calculation unit that calculates a position of the object in the captured image based on the detection information; an overlap determination unit that determines whether objects overlap with each other in the captured image based on a calculation result of the position calculation unit; and an image processing unit that sets an image transmission region in at least a part of a region displaying a first object present on a near side among a plurality of objects determined to overlap with each other in the captured image, generates a image capable of confirming a second object present on a far side of the first object, and changes a transmittance defined in the image transmission region higher as the accuracy factor of the detection of the second object is higher.

According to the above image generation program, even when the accuracy factor of the detection of the second object is low, in the image of the display device, the image transmission region in which the transmittance is defined can be set in at least a part of the region in which the first object existing on the near side is displayed. Therefore, the image of the display device is in a state in which the second object existing on the far side of the first object can be confirmed. If the transmittance defined in the image transmission region is defined to be low at a stage where the accuracy factor is low, an image portion reflecting the second object is displayed in an inconspicuous manner. In addition, the accuracy factor of the detection of the second object is intuitively indicated to the viewer at a transmittance defined in the image transmission region. According to the above configuration, even if the second object is erroneously displayed at an early stage in which the accuracy factor is low, the viewer hardly feels troublesome in the erroneous display. This makes it possible to early notify the second object present on the far side while inhibiting the troublesomeness of the image.

According to an example embodiment, in a non-transitory tangible computer-readable recording medium including instructions for causing a computer to function as a image output device for generating a image of the periphery of a vehicle output to a display device in a vehicle mounted with an imaging unit that images the periphery of the vehicle and a detection unit that is installed in a traveling direction of the vehicle from the imaging unit and detects the object in the periphery of the vehicle, the instructions comprising: acquiring the captured image of the periphery captured by the imaging unit; acquiring detection information of the object detected by the detection unit; determining a accuracy factor of detection of the object based on the detection information; calculating a position of the object in the captured image based on the detection information; determining an overlap of objects in the captured image based on the calculation result of calculating the positions of the objects; and setting an image transmission region in at least a part of a region displaying a first object present on a near side among a plurality of objects determined to overlap with each other in the captured image, generating the image capable of confirming a second object present on a far side of the first object, and changing a transmittance defined in the image transmission region higher as the accuracy factor of the detection of the second object is higher.

According to the above-mentioned non-transitory tangible computer-readable recording medium, even when the accuracy factor of the detection of the second object is low, in the image of the display device, the image transmission region in which the transmittance is defined can be set in at least a part of the region in which the first object present on the near side is displayed. Therefore, the image of the display device is in a state in which the second object existing on the far side of the first object can be confirmed. If the transmittance defined in the image transmission region is defined to be low at a stage where the accuracy factor is low, an image portion reflecting the second object is displayed in an inconspicuous manner. In addition, the accuracy factor of the detection of the second object is intuitively indicated to the viewer at a transmittance defined in the image transmission region. According to the above configuration, even if the second object is erroneously displayed at an early stage in which the accuracy factor is low, the viewer hardly feels troublesome in the erroneous display. This makes it possible to early notify the second object present on the far side while inhibiting the troublesomeness of the image.

Hereinafter, a plurality of embodiments of the present disclosure will be described with reference to the drawings. Incidentally, the same reference numerals are assigned to the corresponding components in each embodiment, and thus, duplicate descriptions may be omitted. When only a part of the configuration is described in each embodiment, the configuration of the other embodiments described above can be applied to other parts of the configuration. Further, not only the combinations of the configurations explicitly shown in the description of the respective embodiments, but also the configurations of the plurality of embodiments can be partially combined together even if the configurations are not explicitly shown if there is no problem in the combination in particular. Unspecified combinations of the configurations described in the plurality of embodiments and the modification examples are also disclosed in the following description.

First Embodiment

Figure 2:
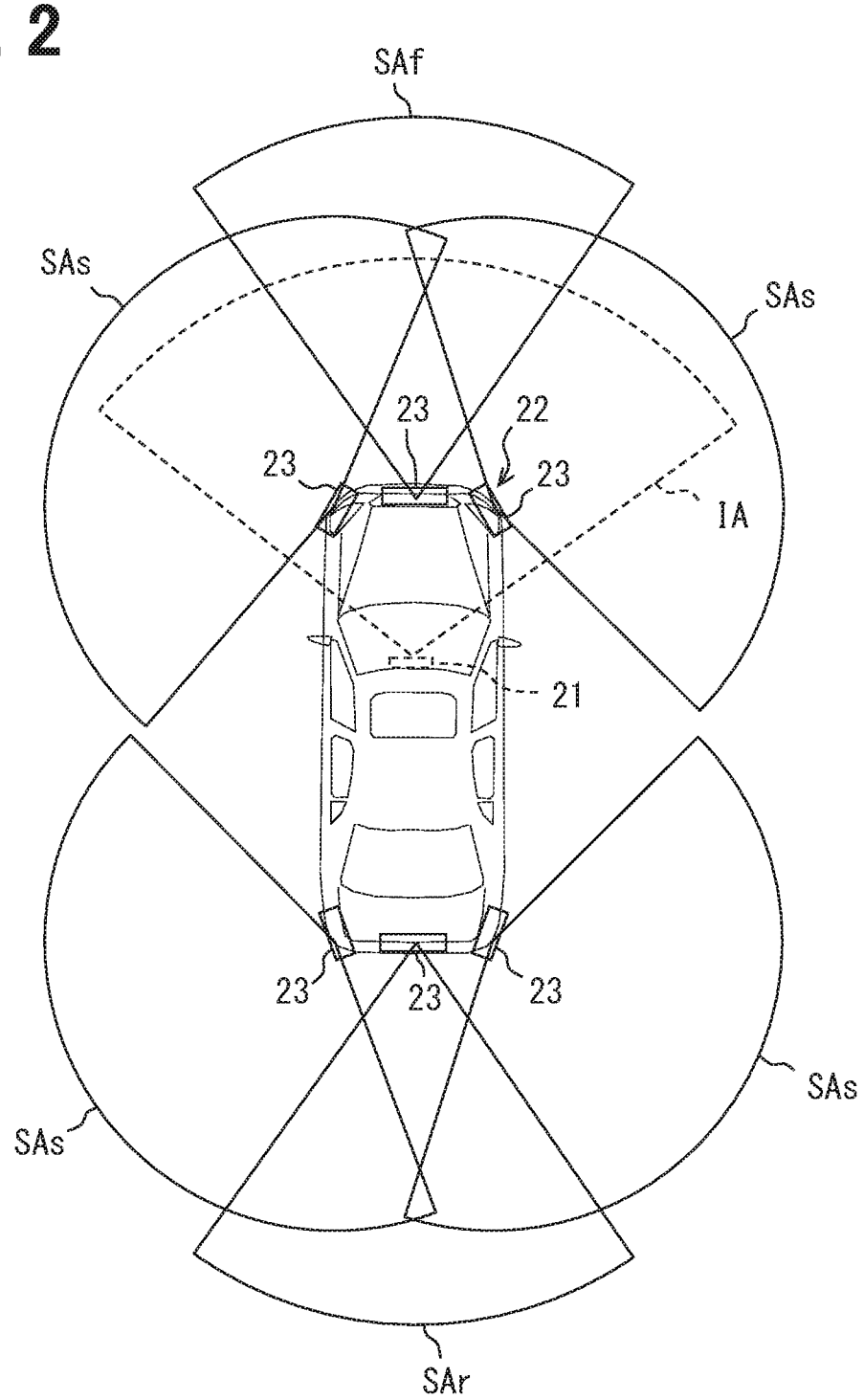
FIG. 2 is a plan view of a host vehicle showing a placement of an external sensor and the like mounted on the vehicle.

A video image output device 100 according to a first embodiment of the present disclosure shown in FIG. 1 is an electronic control unit mounted on a vehicle A together with a display 30. The video image output device 100 displays a video image of the periphery of the host vehicle A on the display 30. An occupant such as a driver of the host vehicle A (hereinafter referred to as a "viewer") can confirm a state of the periphery of the host vehicle A by viewing a video image of the display 30. In addition to the display 30, the video image output device 100 is electrically connected directly or indirectly to external sensors such as a front cameras 21 and a detection unit 22, a vehicle speed sensor 26 and an acceleration sensor 27, a GNSS receiver 28, a map database 29, and the like, as shown in FIGS. 1 and 2.

The display 30 is, for example, a liquid crystal display, an organic EL display, a plasma display, or the like. The display 30 has a display screen 31. The display 30 is accommodated in an instrument panel or the like in a posture in which the display screen 31 faces a driver's seat so that the display screen 31 can be visually recognized by a viewer seated in the driver's seat. The display 30 can display various images in full color on the display screen 31 based on a video image signal input from the video image output device 100. Instead of the display 30 having the display screen 31, a head-up display for displaying a virtual image by projecting a light onto a windshield may be provided.

Figure 4:
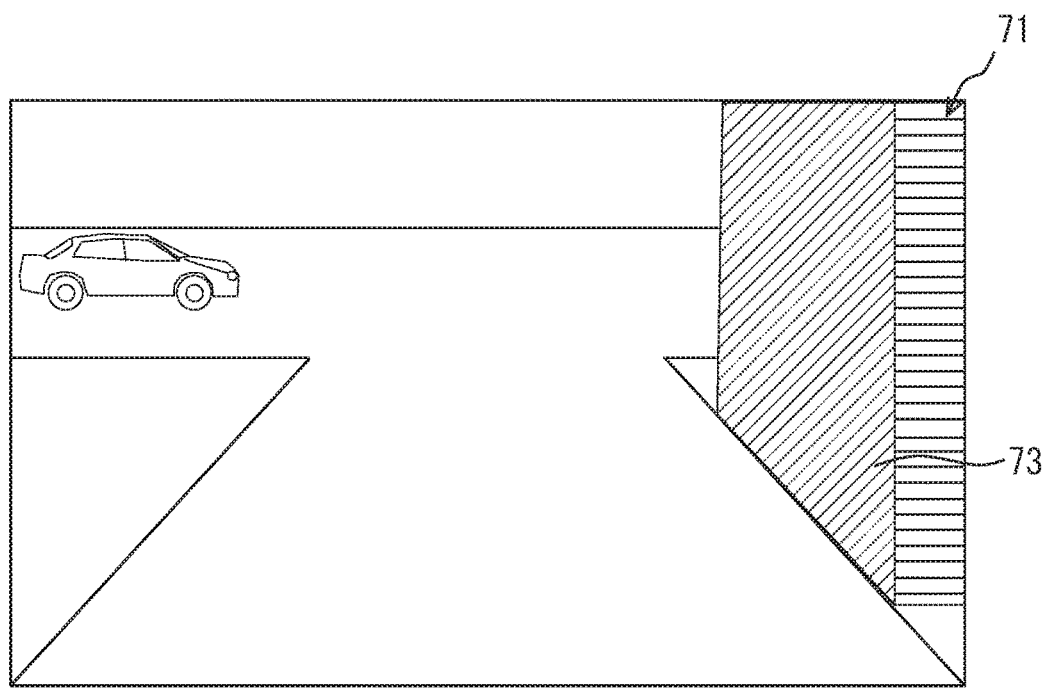
FIG. 4 is a diagram showing a captured image in the scene shown in FIG. 3.

The front camera 21 is installed in the vicinity of a rearview mirror, for example, in the interior of the host vehicle A. The front camera 21 is a monocular or multi-ocular imaging device, and is directed in a traveling direction (front) of the vehicle. A video image acquisition region IA of the front camera 21 is particularly set in a front region of the periphery of the host vehicle A. The front camera 21 continuously captures an image of the video image acquisition region IA, and generates a series of captured images 71 (refer to FIG. 4) showing a moving object and a stationary object existing in the video image acquisition region IA. The front camera 21 sequentially outputs a series of captured images 71, which are video image data, to the video image output device 100.

The detection unit 22 detects a moving object and a stationary object existing in the periphery of the host vehicle A, and measures a relative position of those detected objects. The detection unit 22 repeats the search for each of object detection regions SAf, SAr, and SAs at a predetermined cycle, and sequentially outputs detection information indicating the position and direction of the detected object to the video image output device 100. Each of the object detection regions SAf, SAr, and SAL substantially encompasses the entire circumference of the host vehicle A. The detection unit 22 includes, for example, the radar 23, the lidar 24, the sonar 25, and the like.

The multiple radars 23 are mounted on the host vehicle A. As an example, one radar 23 is installed at each of the center portions of the front and rear ends of the host vehicle A and at each of the left and right ends of the host vehicle A. The three radars 23 installed on the front edge of the host vehicle A are positioned in the traveling direction of the host vehicle A with respect to the front camera 21. The radar 23 located at the center of the front edge emits millimeter waves from a transmission antenna toward the object detection region SAf defined in the traveling direction of the host vehicle A. The radar 23 receives millimeter waves reflected by a moving object, a stationary object, and the like existing in the object detection region SAf by a reception antenna. Similarly, each radar 23 located at the left and right ends of the front edge emits millimeter waves toward each object detection region SAs defined in the right front and left front, and receives millimeter waves reflected by the object in each object detection region SAs. Each radar 23 repeats the search for each of the object detection regions SAf, SAr, and SAL in a cycle of, for example, 50 to 100 milliseconds, and sequentially outputs the scanning result based on the received signal as detection information to the video image output device 100.

For example, one lidar 24 can be installed at each of the left and right ends of the front and rear ends of the host vehicle A instead of the radars 23 at the four corners of the host vehicle A. The lidar 24 irradiates a laser light toward the periphery of the host vehicle A, and receives a laser beam reflected by the moving object and the stationary object existing in the irradiation direction. The lidar 24 sequentially outputs a scanning result based on the received laser light to the video image output device 100 as detection information.

For example, one sonar 25 is provided at each central portion and each left and right end in front and rear bumpers of the host vehicle A. The sonar 25 emits ultrasonic waves toward the periphery of the host vehicle A, and receives reflected waves reflected by the moving object and the stationary object existing in the emission direction. The sonar 25 sequentially outputs the measurement result based on the received reflected wave to the video image output device 100 as detection information.

In this example, the configuration of the detection unit 22 can be appropriately changed. For example, the sonar 25 may be omitted. Further, the mounting position and the sum total number of the sensors such as the radar 23 may be appropriately changed. FCM (Fast Chirp Modulation), 2F (2 Freq.) CW, FMCW (Frequency Modulated Continuous Wave), combinations of those systems, and the like can be employed as the millimeter-wave modulation system of the radar 23. A DBF (Digital Beam Forming) method, a Capon method, a MUSIC (Multiple Signal Classification) method, and the like can be adopted as an algorithm for expanding the azimuth of the millimeter wave.

The vehicle speed sensor 26 measures the current traveling speed of the host vehicle A. The acceleration sensor 27 measures the current acceleration in a front-rear direction and a left-right direction of the host vehicle A. The measurement results obtained by the vehicle speed sensor 26 and the acceleration sensor 27 are sequentially output to the video image output device 100 or the like as state information indicating the movement state of the host vehicle A.

The GNSS (Global Navigation Satellite System) receiver 28 receives positioning signals from multiple positioning satellites. The GNSS receiver 28 measures the current position of the host vehicle A based on the received positioning signals, and acquires the position information of the host vehicle A. The GNSS receiver 28 sequentially outputs the acquired position information to the video image output device 100. The GNSS receiver 28 is capable of receiving positioning signals from respective positioning satellites of at least one satellite positioning system among satellite positioning systems such as a GPS, a GLONASS, a Galileo, an IRNSS, a QZSS, and a Beidou.

The map database (hereinafter referred to as "map DB") 29 mainly includes a large-capacity storage medium storing a large number of map data. The map data includes shape information about roads and structures, and so on. The map database 29 provides map data about the periphery of the host vehicle A and the traveling direction of the host vehicle A to the video image output device 100 in response to a request from the video image output device 100.

Figure 3:
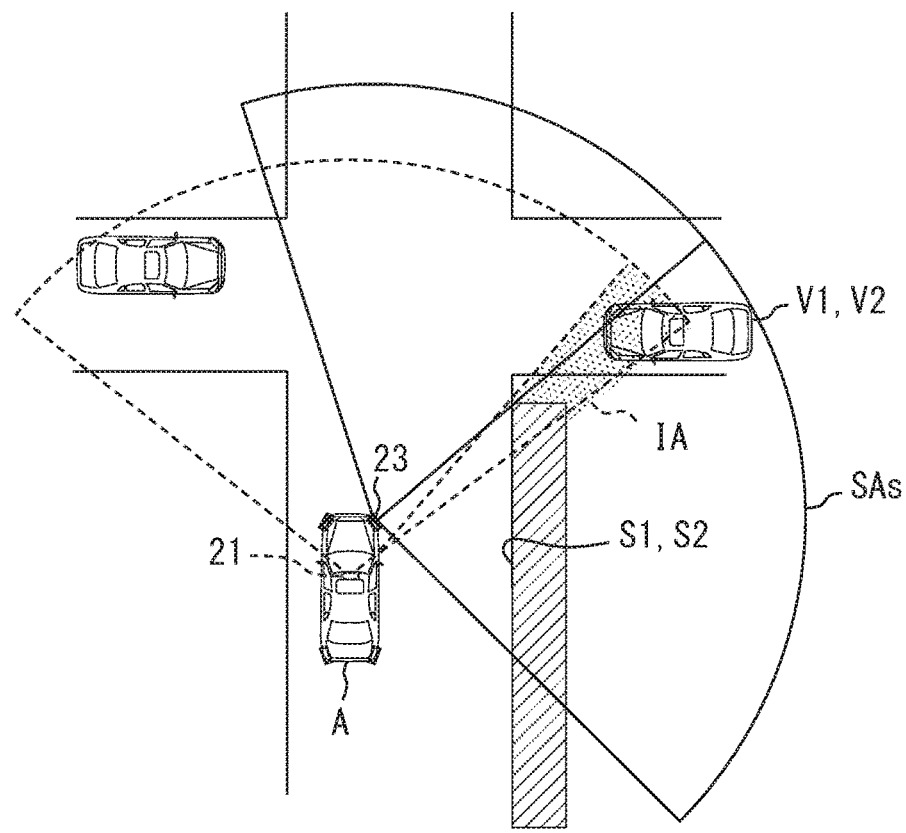
FIG. 3 is a diagram showing an example of a scene in which an image transmission region is set as a periphery confirmation video image.

The video image output device 100 produces a video image 70 in the front region of the host vehicle A (hereinafter referred to as "periphery confirmation video image") and output the periphery confirmation video image to the display 30. The video image output device 100 processes the captured image 71 (refer to FIG. 4) captured by the front camera 21 to generate the periphery confirmation video image 70 (refer to FIG. 5). For example, in the scene shown in FIG. 3, an obstruction S1 exists between the host vehicle A and another vehicle. For that reason, the other vehicle located on the far side of the obstruction S1 as viewed from the host vehicle A becomes a blind spot object V1 that exists in a range (dot range in FIG. 3) that becomes a blind spot of the obstruction S1 located on the near side. In the presence of such a blind spot object V1, the periphery confirmation video image 70 is generated by image processing in which an object image 74, a vector image 75, and a background image 76 are superimposed on the captured image 71.

Figure 5:
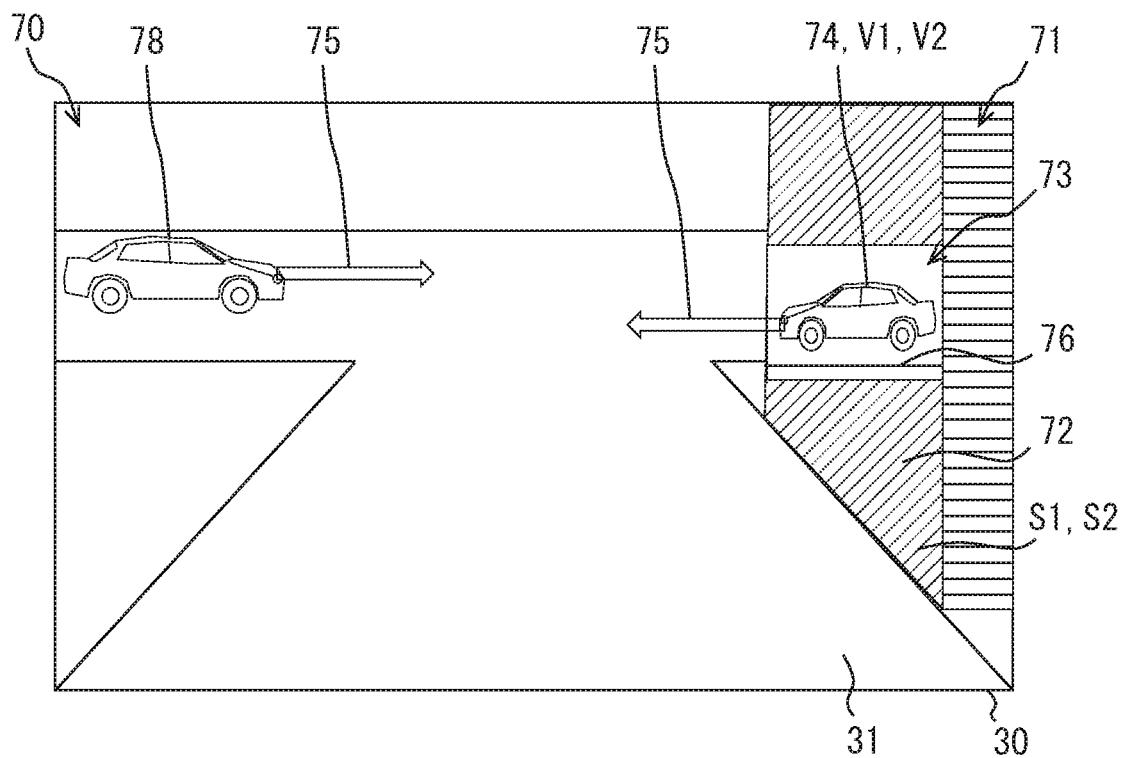
FIG. 5 is a diagram showing a periphery confirmation video image displayed on a display screen in the scene shown in FIG. 3.

More specifically, as shown in FIG. 5, an image transmission region 73 that is semi-transparent is set in a part of an image 72 (hereinafter referred to as "obstruction image") of the obstruction S1 in the captured image 71. On the other hand, the object image 74 is an image showing another vehicle which is the blind spot object V1 (refer to FIG. 3). The vector image 75 is an image in the form of an arrow indicating a moving direction or the like of a moving detected object. The background image 76 is an image that reproduces the background of the blind spot object V1. The periphery confirmation video image 70 obtained by combining those images 74 to 76 with the captured image 71 is obstructed by the obstruction S1, and becomes a video image in which the blind spot object V1, which should not be seen by the driver of the host vehicle A, can be confirmed on the far side of the obstruction S1. In the following description, the host vehicle A on which the video image output device 100 shown in FIG. 1 is mounted is referred to as "host vehicle A" in order to distinguish from another vehicle which is the blind spot object V1.

The control circuit of the video image output device 100 shown in FIG. 1 are mainly configured by a computer having a calculation unit 41, a storage unit 42, a RAM 43, and the like. The calculation unit 41 includes at least one of a CPU (Central Processing Unit), a GPU (Graphics Processing Unit), and an FPGA (Field-Programmable Gate Array). The calculation unit 41 executes various calculation processing. The storage unit 42 includes a nonvolatile storage medium. Various programs including a video image generation program are stored in the storage unit 42 so as to be readable by the calculation unit 41. The RAM (Random Access Memory) 43 is a volatile semiconductor memory. The RAM 43 functions as a work region of the calculation processing by the calculation unit 41.

The video image output device 100 configures multiple functional blocks by executing the video image generation program stored in the storage unit 42 by the calculation unit 41. Specifically, the video image output device 100 configures an image acquisition unit 51, a detection information acquisition unit 53, a host vehicle information acquisition unit 55, a map information acquisition unit 57, and the like as functional blocks for acquiring information necessary for generating the periphery confirmation video image 70 (refer to FIG. 5). In addition, the video image output device 100 configures, as functional blocks for processing the acquired information, a accuracy factor determination unit 61, a position calculation unit 62, an overlap determination unit 63, an object tracking unit 64, an object identification unit 65, an approach determination unit 66, a movement estimation unit 68, and the like. Further, the video image output device 100 configures an image processing unit 40 or the like as a functional block for generating the periphery confirmation video image 70.

The image acquisition unit 51 acquires a captured image 71 in the video image acquisition region IA (refer to FIG. 2) captured by the front camera 21. The detection information acquisition unit 53 acquires detection information on an object existing in each of the object detection regions SAf, SAr, and SAL detected by the detection unit 22 such as the radar 23. Among the detected objects detected by the detection unit 22, an object that exists in the blind spot of the obstruction S1 (refer to FIG. 3) and does not appear in the captured image 71 is the blind spot object V1 (refer to FIG. 3).

The host vehicle information acquisition unit 55 acquires information such as a speed and an acceleration from the vehicle speed sensor 26 and the acceleration sensor 27 as state information indicating the movement state of the host vehicle A. The map information acquisition unit 57 acquires the present position information of the host vehicle A from the GNSS receiver 28. In addition, the map information acquisition unit 57 estimates the moving direction of the host vehicle A from the transition of the position information. The map information acquisition unit 57 acquires map data of a front region of the host vehicle A including the video image acquisition region IA, the object detection regions SAf and SAs (refer to FIG. 2), and the like, based on the position information and the like.

The accuracy factor determination unit 61 determines the accuracy factor of detection of the detected object based on the detection information acquired by the detection information acquisition unit 53. The accuracy factor determination unit 61 performs the existence determination that the object exists when the number of detection times n of the object existing in the object detection regions SAf, SAs, etc. in a predetermined time by the search of the radar 23 exceeds a predetermined threshold value. Similar to the case of the existence determination described above, the accuracy factor determination unit 61 determines the accuracy factor of the detection information provided from the radar 23 based on the number of detection times n of the object in the predetermined time. The accuracy factor determination unit 61 determines the accuracy factor of the detection of the same object to be high as the number of detection times n of the same object in a predetermined time increases (refer to S122 in FIG. 8).

The position calculation unit 62 calculates the position of each detected object in the captured image 71 (refer to FIG. 4) based on the detection information acquired by the detection information acquisition unit 53, in particular, the position information of the detected object. For example, when the blind spot object V1 (refer to FIG. 3) is detected by the detection unit 22, the position calculation unit 62 calculates a virtual position and a virtual image size in the image of the blind spot object V1 that is not captured in the captured image 71 based on the position information of the blind spot object V1.

More specifically, the front camera 21 and each radar 23 are mounted at predetermined positions of the host vehicle A defined at the time of design. Therefore, the position at which the detected object appears in the captured image 71 is uniquely determined on the basis of the position information of the detected object and the information indicating the radar 23 that has detected the position information.

Further, the image size when the detected object is included in the captured image 71 is also uniquely determined based on the information indicating the size of the detected object and the position information. Therefore, the position calculation unit 62 can calculate the position and the size of the detected object in the image by geometric calculation using the detection information of the detected object.

The overlap determination unit 63 determines whether or not the objects in the captured image 71 overlap with each other based on the calculation result of the position calculation unit 62. In the scene shown in FIG. 3, the radar 23 at the front edge and at the right end of the host vehicle A can acquire not only the detection information of the obstruction S1 but also the detection information of another vehicle (the blind spot object V1). On the other hand, in the captured image 71 (refer to FIG. 4) in this scene, only the obstruction S1 is imaged, and the other vehicle is not imaged. Like the obstruction S1 and other vehicles in the scene described above, the overlap determination unit 63 shown in FIG. 1 uses the calculation result of the position calculation unit 62 to determine whether or not the detected objects overlap with each other in the captured image 71.

The object tracking unit 64 tracks the moving detected object based on the detection information sequentially acquired by the detection information acquisition unit 53. The object tracking unit 64 calculates the moving direction and the moving speed of the tracked detected object (hereinafter, referred to as "tracked object V2" in FIG. 9). The object tracking unit 64 estimates a future movement path of the tracked object based on the tracking result of the tracked object. As an example, a trajectory that the tracked object V2 traces when the current moving direction and moving speed are maintained is taken as the future movement path of the tracked object V2 by the object tracking unit 64.

The object identification unit 65 determines the type of the detected object based on the detection information acquired by the detection information acquisition unit 53. The object identification unit 65 estimates one of multiple preset types with high validity as the type of the detected object based on the rough shape of the detected object estimated from the detection information, and the measurement result such as the moving speed, the reflection intensity of the millimeter wave. In the object identification unit 65 sets, as the type of the detected object, for example, a large car, a passenger car, a motorcycle, a cyclist, and a pedestrian, in advance. In the case where the degree of determination of detection is low, it is difficult to estimate the type of the detected object from the detection information. In this case, the object identification unit 65 identifies that the type of the detected object is "unknown".

The approach determination unit 66 determines whether or not the tracked object V2 (refer to FIG. 9) approaches the host vehicle A based on the tracking result of the object tracking unit 64. Further, the approach determination unit 66 acquires the movement path of the tracked object V2 estimated by the object tracking unit 64 and the movement path of the host vehicle A estimated by the movement estimation unit 68. The approach determination unit 66 compares the tracked object V2 with the respective movement paths of the host vehicle A, and sets a risk level of the tracked object V2 based on the determination as to whether or not those movement paths intersect with each other. The higher the possibility of excessively approaching the host vehicle A, the higher the risk level is set for the tracked object V2 by the approach determination unit 66.

The movement estimation unit 68 estimates a future movement path of the host vehicle A based on the state information indicating the movement state of the host vehicle A acquired by the host vehicle information acquisition unit 55. The movement path estimated by the approach determination unit 66 is provided to the approach determination unit 66 as described above. The movement estimation unit 68 sets the trajectory followed by the host vehicle A as the future movement path of the host vehicle A on the assumption that the current moving direction and moving speed are maintained.

The image processing unit 40 generates an image of each frame configuring the periphery confirmation video image 70, and outputs a video image signal of the periphery confirmation video image 70 to the display 30 in real time. When the overlap determination unit 63 determines that the detected objects overlap with each other in the captured image 71 (refer to FIG. 3), the image processing unit 40 acquires the virtual position and the virtual image size of the blind spot object V1 from the position calculation unit 62. The image processing unit 40 sets the size of the image transmission region 73 so as to be larger than the virtual image size of the blind spot object V1 by one size. Then, the image processing unit 40 sets the image transmission region 73 in at least a partial range of the obstruction image 72 with reference to the virtual position of the blind spot object V1. Further, the image processing unit 40 defines the transmittance of the image transmission region 73 based on the accuracy factor determined by the accuracy factor determination unit 61.

When the detected objects overlap with each other, the image processing unit 40 draws the object image 74, the vector image 75, the background image 76, and the like described above. The image data on which those images 74 to 76 are based are stored in advance in an image database 69 (hereinafter referred to as "image DB"). The image processing unit 40 reads out the required image data from the image DB 69 on the basis of the above-mentioned information related to the blind spot object V1, and performs processing such as deformation and coloring to draw the images 74 to 76.

Specifically, the image processing unit 40 generates the object image 74 corresponding to the determination result of the object identification unit 65. For example, when the determination result indicates a passenger car, the image processing unit 40 reads out image data of the passenger car from the image DB 69. Similarly, when the determination result indicates a pedestrian, the image processing unit 40 reads out the image data of the pedestrian from the image DB 69. The image processing unit 40 enlarges or reduces the read image data to the virtual image size, and superimposes the image data on the image transmission region 73 with reference to the virtual position. When the type of the detected object is identified to be "unknown" by the object identification unit 65, the image processing unit 40 superimposes the object image 74 of an abstracted shape (refer to FIG. 6) on the image transmission region 73 in place of the object image 74 indicating the appearance shape of the detected object.

The image processing unit 40 changes a pattern of the vector image 75 according to the movement state of the tracked object V2 (refer to FIG. 9) calculated by the object tracking unit 64. A direction of the vector image 75 is set based on the direction of movement of the tracked object V2 and is set to indicate the direction of movement within the captured image 71 when the tracked object V2 is included in the captured image 71. A length of the vector image 75 is set based on the moving speed of the tracked object V2 and increases as the speed of movement increases. As an example, the length of the vector image 75 is displayed in a length proportional to the moving speed. The thickness and the display color of the vector image 75 are changed in accordance with a risk level determined by the approach determination unit 66. The higher the risk level of the detected object, the thicker the vector image 75. As the risk level of the detected object is higher, the display color of the vector image 75 is changed from, for example, a notification color such as yellow to a warning color such as red with higher visual attractiveness. Note that the vector image 75 may be superimposed and displayed not only in the vicinity of the object image 74 but also in the vicinity of the image 78 (refer to FIG. 5) or the like of another vehicle included in the captured image 71.

The image processing unit 40 estimates the state of the region obstructed by the obstruction S1 and serving as the background of the blind spot object V1, with the use of the captured image 71, the detection information, the map data, and the like. For example, the image processing unit 40 extends a boundary line of a roadway shown in the captured image 71 into the image transmission region 73, and draws a boundary line of the roadway as the background image 76. Further, when a guard rail is detected in the blind spot range by the detection unit 22, the image processing unit 40 generates the background image 76 including the guard rail by image processing for extending the image pattern of the guard rail in the captured image 71 into the image transmission region 73. When a parked vehicle is detected in the blind spot area by the detection unit 22, the image processing unit 40 processes the image data of the vehicle read out from the image DB 69 to generate the background image 76 including the parked vehicle. Further, when the road shape in a blind spot range and the shape of a structure are acquired from the map data, the image processing unit 40 can generate the background image 76 including correct road and structure with the use of those pieces of information. The image processing unit 40 superimposes the background image 76 generated as described above on the far side of the image transmission region 73 and the object image 74.

The image processing unit 40 described above can select a detected object to be notified based on the approach determination or the intersection determination of the approach determination unit 66. As an example, the image processing unit 40 sets the image transmission region 73 in the obstruction image 72 only when the blind spot object V1 approaches the host vehicle A, and calls an attention of the blind spot object V1 by the object image 74. Alternatively, the image processing unit 40 sets the image transmission region 73 in the obstruction image 72 only when the movement path of the blind spot object V1 intersects with the movement path of the host vehicle A, and calls the attention of the blind spot object V1 by the object image 74.

The image processing unit 40 described so far changes the transmittance defined in the image transmission region 73 to be higher as the accuracy factor of detection of the blind spot object V1 increases. Hereinafter, the video image generation process for generating the periphery confirmation video image 70 including the image transmission region 73 and the transmittance control process for controlling the transmittance of the image transmission region 73 will be described with reference to FIGS. 7 and 8, and with reference to FIGS. 1 and 5. The video image generation process and the transmittance control process are repeatedly performed by the periphery confirmation video image 70 based on the fact that the display function of the periphery confirmation video image 70 is turned on automatically or by a viewer.

Figure 7:
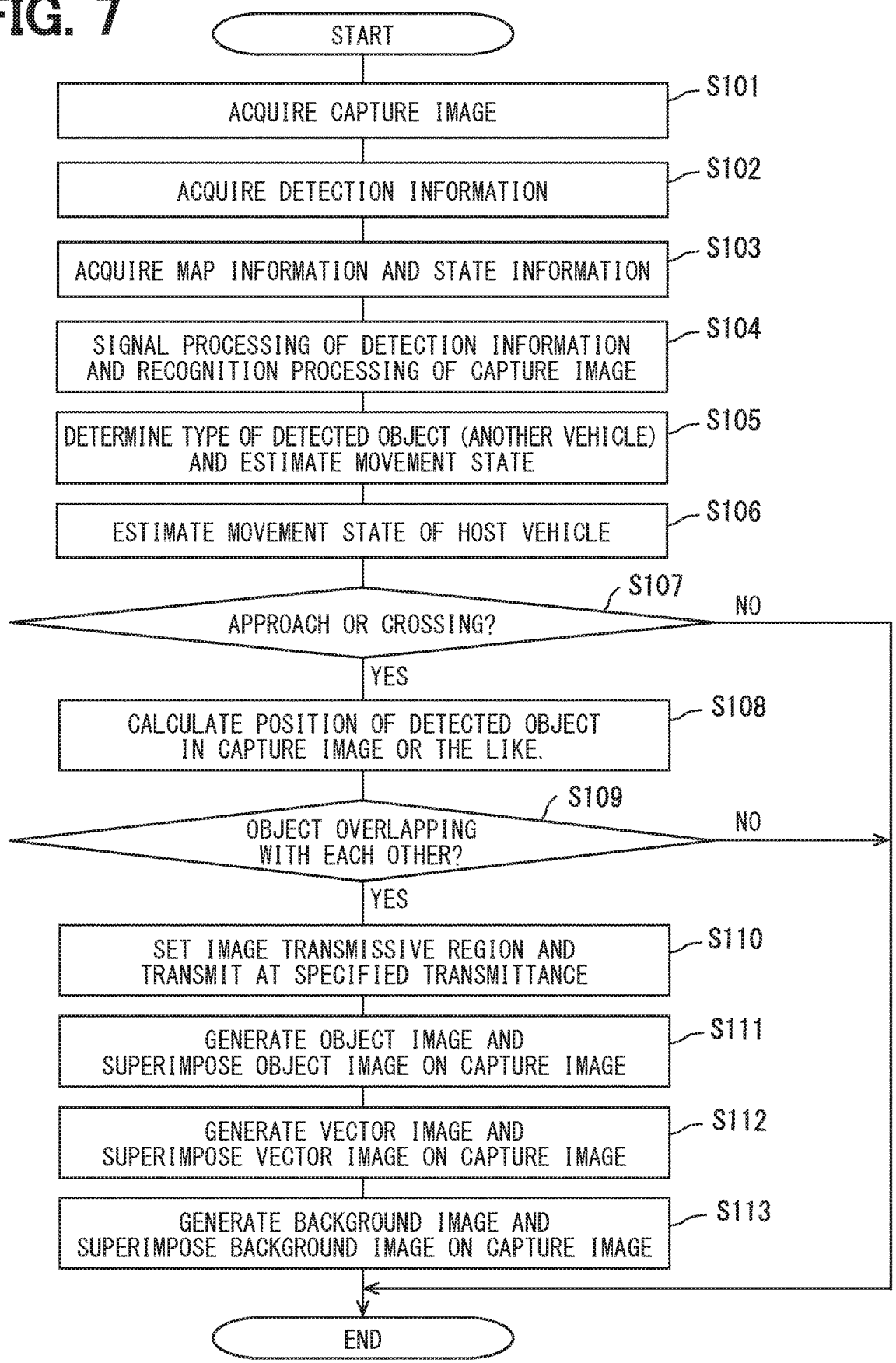
FIG. 7 is a flowchart showing details of a video image generation process.

In S101 of the video image generation process shown in FIG. 7, the captured image 71 captured by the front camera 21 is acquired, and the process proceeds to S102. In S102, the detection information of the detected object detected by the detection unit 22 is acquired, and the process proceeds to S103. In S103, the movement information indicating the movement state of the host vehicle A is acquired from the vehicle speed sensor 26 and the GNSS receiver 28. In addition, in S103, map data of a region including at least the video image acquisition region IA in the captured image 71 is acquired from the map DB 29 while referring to the movement information based on the position information of the host vehicle A, and the process proceeds to S104. In S104, the signal processing of the detection information acquired in S102 and the recognition processing of the captured image 71 acquired by the S101 are performed, and the process proceeds to S105.

In S105, the type of the detected object (for example, other vehicles) is identified based on the detection information acquired in S102. In addition, in S105, the tracking process of each detected object is performed on the basis of the continuously acquired detection information. Then, the movement states such as the moving directions and the moving speeds of the respective detected objects are calculated based on the tracking results of the detected objects, and the future movement paths of the detected objects are further estimated, and the process proceeds to S106.

In S106, the future travel route of the host vehicle A is estimated based on the state information of the host vehicle A acquired in S103, and the process proceeds to S107. In S107, it is determined whether or not each detected object approaches the host vehicle A on the basis of comparing the movement path of each detected object based on the tracking result estimated in S105 with the movement path of the host vehicle A estimated in S106. When it is determined in S106 that all the detected objects do not approach the host vehicle A, the video image generation process is temporarily terminated. On the other hand, when it is determined in S107 that there is a detected object approaching the host vehicle A, the process proceeds to S108. In that case, the captured image 71 is displayed on the display screen 31 as the periphery confirmation video image 70 as it is.

In this example, in S107, the process of determining whether or not the future movement path of the host vehicle A and the future movement path of the detected object intersect with each other can be performed instead of the approach determination described above. In such intersection determination, when it is determined that the movement paths of all the detected objects and the movement paths of the host vehicle A do not intersect with each other, the video image generation process is temporarily terminated. On the other hand, when it is determined that there is a detected object that intersects with the future movement path of the host vehicle A, the process proceeds to S108.

In S108, the virtual image size and the virtual position of the detected object approaching the host vehicle A or the detected object having a possibility of intersecting the host vehicle A with the movement path in the captured image 71 are calculated based on the detection information acquired in S102, and the process proceeds to S109. In S109, it is determined whether or not the detected objects in the captured image 71 overlap with each other based on the calculation result of S108. When it is determined in S109 that the detected objects do not overlap with each other, the video image generation process is temporarily terminated. Also, in that case, the captured image 71 is displayed on the display screen 31 as the periphery confirmation video image 70 as it is. On the other hand, when it is determined in S109 that the detected objects overlap with each other, the process proceeds to S110.

In S110, the image transmission region 73 is set in at least a part of the obstruction image 72 displaying the detected object (for example, the obstruction S1) existing on the near side. Furthermore, the image transmission region 73 is caused to be transmissive at a transmittance stipulated in a transmittance control process to be described later, and the process proceeds to S111. In S111, the object image 74 is generated on the basis of the identification result of the type in S105 or the like, and is superimposed on the captured image 71, and the process proceeds to S112.

In S112, a vector image 75 is generated based on the movement state of the detected object calculated in S105, and superimposed on the captured image 71, and the process proceeds to S113. In S113, the background image 76 is generated based on the map data acquired in S103, the result of the signal processing and the recognition processing in S114, and the like, and the background image 76 is superimposed on the captured image 71, and the video image generation process is temporarily terminated. Through the processing in S110 to S113 described above, the periphery confirmation video image 70 obtained by processing the captured image 71 is generated and displayed on the display screen 31.

Figure 8:
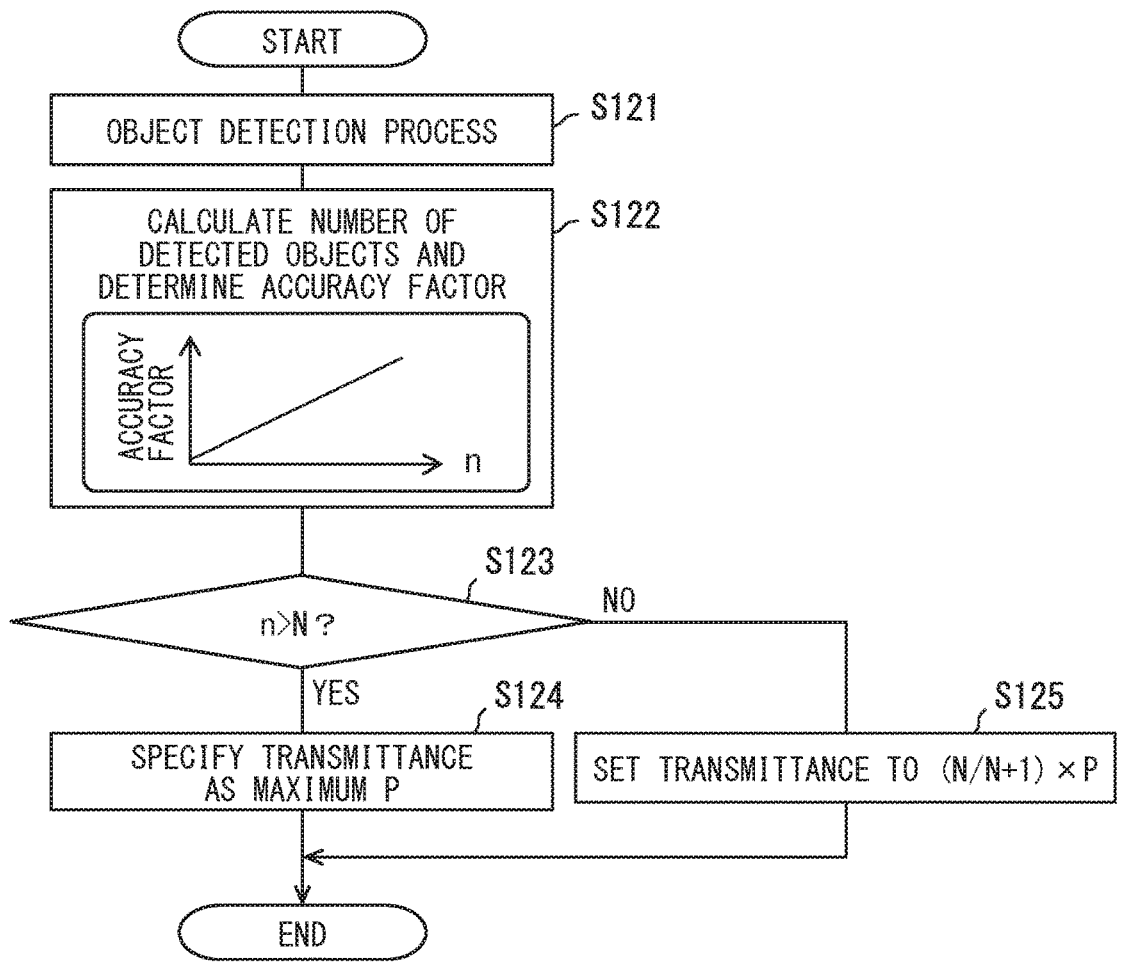
FIG. 8 is a flowchart showing details of a transmittance control process.

In the transmittance control process shown in FIG. 8, the transmittance of the image transmission region 73 is set with the use of the accuracy factor based on the number of detection times n of the detected object. In S121 of the transmittance control process, the object detection process based on the detection information acquired in S102 (refer to FIG. 7) of the video image generation process is performed, and the process proceeds to S122. In S121, a process may be performed in which the result of the signal processing in S104 (refer to FIG. 7) of the video image generation process is directly referred to.

In S122, the number of detection times n in which each detected object is detected in the detection process in S121 is calculated, and the accuracy factor is further determined, and the process proceeds to S123. In S123, it is determined whether or not the number of detection times n calculated in S122 exceeds a predetermined number threshold N. If it is determined in S123 that the number of detection times n exceeds the number threshold N, the process proceeds to S124.

In S124, the transmittance of the image transmission region 73 defined in S110 of the video image generation process (refer to FIG. 8) is set to a predetermined maximum value p (for example, about 90%), and the transmittance control processing is once terminated. On the other hand, when it is determined in S123 that the number of detection times n is equal to or less than the number threshold N, the process proceeds to S125.

In S125, the transmittance of the image transmission region 73 is set based on a predetermined calculation expression {n/(N+1)×p}, and the transmittance control process is once terminated. According to the setting in S125, the transmittance gradually increases as the number of detection times n increases, that is, until the number of detection times reaches a maximum value p with an increase in the accuracy factor.

In the above description, a scene in which the image transmission region 73 is set in the periphery confirmation video image 70 when only the detection unit 22 of the front camera 21 and the detection unit 22 has detected a detected object has been described. In addition to such a scene, the image processing unit 40 generates the periphery confirmation video image 70 including the image transmission region 73 with the use of a past detection history of the detection unit 22 even in a scene in which neither the front camera 21 nor the detection unit 22 is able to detect a detected object. Details of such a scene will be described below with reference to FIGS. 9 and 10.

Figure 9:
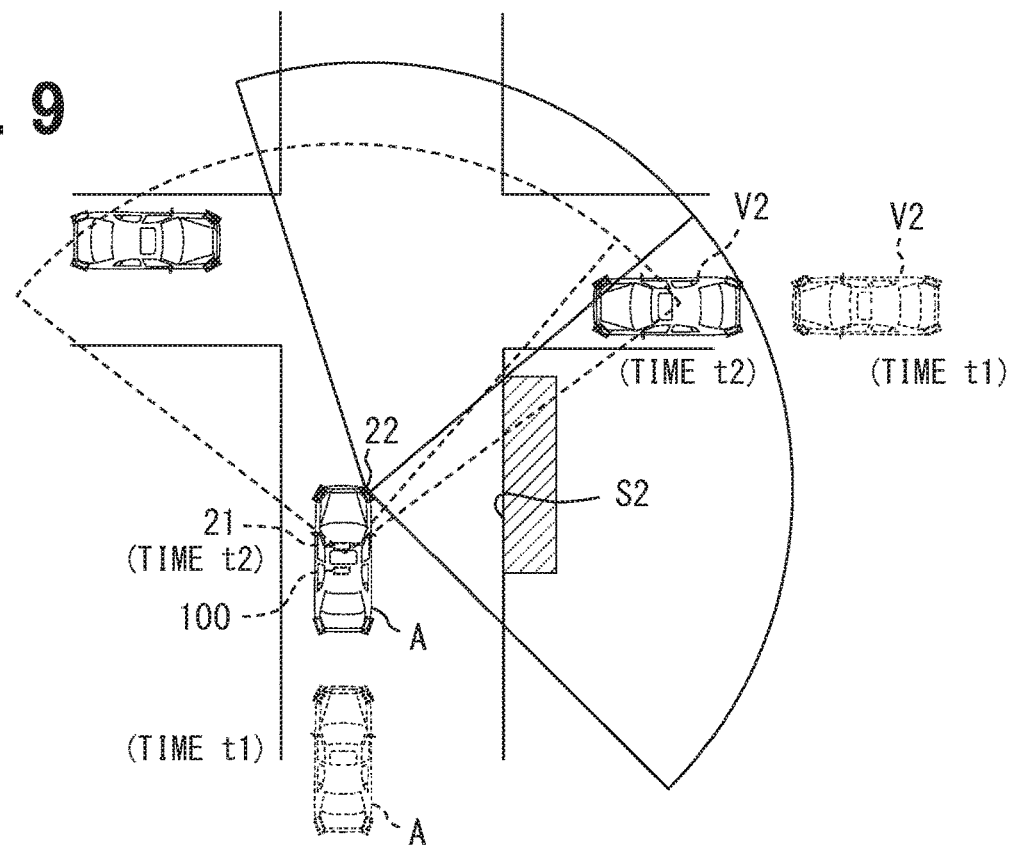
FIG. 9 is a diagram showing an example of a scene in which a tracked object enters a blind spot of an obstruction.

In the scene of an intersection shown in FIG. 9, at a time t1 (refer to a dashed line), the detection unit 22 of the host vehicle A can detect another vehicle (hereinafter refer to as "tracked object V2"). Therefore, the object tracking unit 64 of the host vehicle A (refer to FIG. 1) is in a state of tracking the tracked object V2. However, in a period from the time t1 to a time t2 when the host vehicle A approaches the intersection, the detection unit 22 of the host vehicle A cannot continue the detection of the tracked object V2 because the tracked object V2 is blocked by the obstruction S2 between the host vehicle A and the other vehicle which is the tracked object V2. As a result, the detection information indicating the tracked object V2 disappears.

In such a scene, the object tracking unit 64 estimates the current position of the tracked object V2 estimated from the history of tracking. Then, the image transmission region 73 defining the transmittance is provided at the current position of the estimated tracked object V2, and the periphery confirmation video image 70 capable of confirming the tracked object V2 present on the far side of the obstruction S2 is generated.

Figure 10:
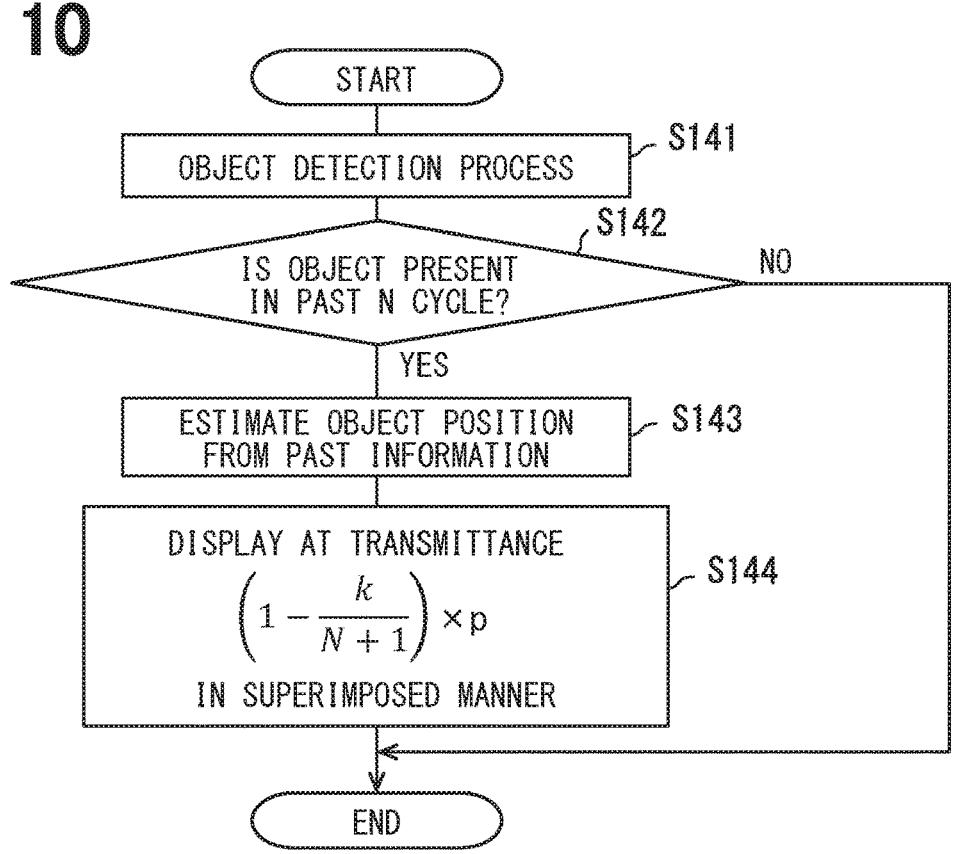
FIG. 10 is a flowchart showing details of a tracking display process executed in the scene shown in FIG. 9.

Hereinafter, the details of the tracking display process for generating the periphery confirmation video image 70 including the image transmission region 73 when the detection information of the tracked object V2 disappears will be described with reference to FIG. 1, FIG. 5, and FIG. 9 with reference to FIG. 10. The tracking display process shown in FIG. 10 is repeatedly performed by the video image output device 100 based on the fact that the display function of the periphery confirmation video image 70 is turned on, similarly to the video image generation process (refer to FIG. 8).

In S141, the object detection process based on the detection information acquired in S102 (refer to FIG. 7) of the video image generation process is performed, and the process proceeds to S142. In S141, a process may be performed in which the result of the signal processing in S104 (refer to FIG. 7) of the video image generation process is directly referred to.

In S142, it is determined whether or not the tracked object V2 exists in the past N cycles in the detection process repeated in S141. When it is determined in S142 that the tracked object V2 does not exist in the past N cycles, the tracking display process is temporarily terminated. In that case, the captured image 71 is displayed on the display screen 31 as the periphery confirmation video image 70 as it is.

On the other hand, when it is determined in S142 that the tracked object V2 exists in the past N cycles, the process proceeds to S143. In S143, the current object position is estimated based on the past information of the object position detected in the past S141. Then, the virtual position and the virtual image size in the captured image 71 of the tracked object V2 are calculated, and the process proceeds to S144.

In S144, the transmittance of the image transmission region 73 is defined, and the object image 74 and the background image 76 are superimposed and displayed on the image transmission region 73. The transmittance is calculated by a predetermined calculation expression (1−k/(N+1))×p. In the above calculation equation, k is a value of a counter which increases by one for each tracking display process. N in the above expression is a threshold of a cycle used for the determination of S142, and is a preset threshold. As described above, the transmittance of the image transmission region 73 gradually decreases as an elapsed time after the detection information of the tracked object V2 disappears increases. As a result, the object image 74 notifying the tracked object V2 gradually disappears from the periphery confirmation video image 70 after the tracked object V2 enters the blind spot of the obstruction S2.

In the first embodiment described so far, even when the accuracy factor of detection of the blind spot object V1 is low, in the periphery confirmation video image 70, the image transmission region 73 in which the transmittance is defined is set in the obstruction image 72 in which the obstruction S1 existing on the near side is displayed. Therefore, the periphery confirmation video image 70 is in a state in which the blind spot object V1 existing on the far side of the obstruction S1 can be confirmed. In this manner, at the stage where the accuracy factor is low, the transmittance of the image transmission region 73 is defined to be low, and the object image 74 showing the blind spot object V1 is displayed in an inconspicuous manner. In addition, the accuracy factor of the detection of the blind spot object V1 is intuitively shown to the viewer at the transmittance defined in the image transmission region 73. According to the above configuration, even if the object image 74 indicating the blind spot object V1 is erroneously displayed at an early stage in which the accuracy factor is low, the viewer hardly feels troublesome about the erroneous display. Therefore, the blind spot object V1 present on the far side of the obstruction S1 can be early notified while the troublesomeness of the periphery confirmation video image 70 is reduced.

In addition, if the radar 23 or the like is used as the detection unit 22 as in the first embodiment, the position information with high accuracy can be acquired even for the blind spot object V1 existing in the blind spot range of the obstruction S1. As a result, the superimposed position of the object image 74 indicating the blind spot object V1 in the captured image 71 can be accurately calculated. According to the above configuration, the video image output device 100 can accurately present the position of the blind spot object V1 to the viewer by arranging the image transmission region 73 and the object image 74 in an appropriate range of the captured image 71.

Further, the accuracy factor in the first embodiment is determined to be higher as the number of detection times n of the detected object increases. According to such a method for determining the accuracy factor, even if an object (hereinafter referred to as "noise source") such as a signboard or a guard rail made of metal exists in the vicinity of the blind spot object V1, an influence of a noise source on the accuracy factor can be reduced. According to the above configuration, along with the approach of another vehicle, which is the blind spot object V1, to the host vehicle A, the periphery confirmation video image 70 can smoothly gradually increase the transmittance of the image transmission region 73, and can easily notify the viewer of the approach of the other vehicle.

Furthermore, in the first embodiment, the vector image 75 showing the moving direction of the detected object (tracked object V2) is displayed on the periphery confirmation video image 70. When the moving direction of each detected object is presented by the vector image 75 in this manner, the viewer can recognize those motions as soon as the viewer visually recognizes the periphery confirmation video image 70. As a result, the viewer easily quickly selects a driving action for avoiding an object in the periphery of the host vehicle A.

In the first embodiment, a mode of the vector image 75 is changed in accordance with the movement state of each detected object. When the movement state of each detected object is clearly indicated to the viewer in this manner, the viewer can quickly grasp the movement of another vehicle or the like from the periphery confirmation video image 70, and can presume the action of avoiding the other vehicle in advance.

Further, in the first embodiment, even when the tracking of the tracked object V2 becomes difficult to continue due to the obstruction S2, the image transmission region 73 is set in the obstruction image 72 of the obstruction S2, and the periphery confirmation video image 70 capable of confirming the tracked object V2 present on the far side of the obstruction S2 is displayed. According to the above configuration, the number of scenes in which a risk object hidden in the obstruction S2 can be notified by the periphery confirmation video image 70 can be further increased.

In addition, in the first embodiment, after the detection information of the tracked object V2 disappears, the transmittance of the image transmission region 73 in the periphery confirmation video image 70 gradually decreases. As described above, according to the video image display in which the object image 74 for notifying the tracked object V2 is gradually lost, even when the tracked object V2 is no longer present in the blind spot range of the obstruction S2, the sense of discomfort of the viewer can be reduced.

In the first embodiment, only when the blind spot object V1 approaches the host vehicle A by performing the approach determination, the warning of the blind spot object V1 by the periphery confirmation video image 70 can be performed. Therefore, the blind spot object V1, which is obstructed by the obstruction S1 and cannot be directly visually recognized but is less likely to become a risk to the host vehicle A, can be excluded from the target of the warning to the viewer. As described above, according to the process of selecting the blind spot object V1 to be notified, the troublesomeness of the periphery confirmation video image 70 can be further reduced.

Further, in the first embodiment, with the execution of the intersection determination, only when the future movement path of the host vehicle A and the future movement path of the blind spot object V1 intersect with each other, the warning of the blind spot object V1 by the periphery confirmation video image 70 can be executed. Even by the above selection process of the blind spot object V1, the blind spot object V1 which is less likely to become a risk to the host vehicle A can be excluded from the target of warning. As a result, the troublesomeness of the periphery confirmation video image 70 can be further reduced.

In addition, in the first embodiment, the object image 74 indicating the blind spot object V1 is selected based on the identification result obtained by identifying the type of the blind spot object V1. According to the drawing process described above, even if the blind spot object is not captured by the front camera 21, the periphery confirmation video image 70 can present the presence of the blind spot object V1 to the viewer by the pseudo transmission image in which reality is ensured.

Figure 6:
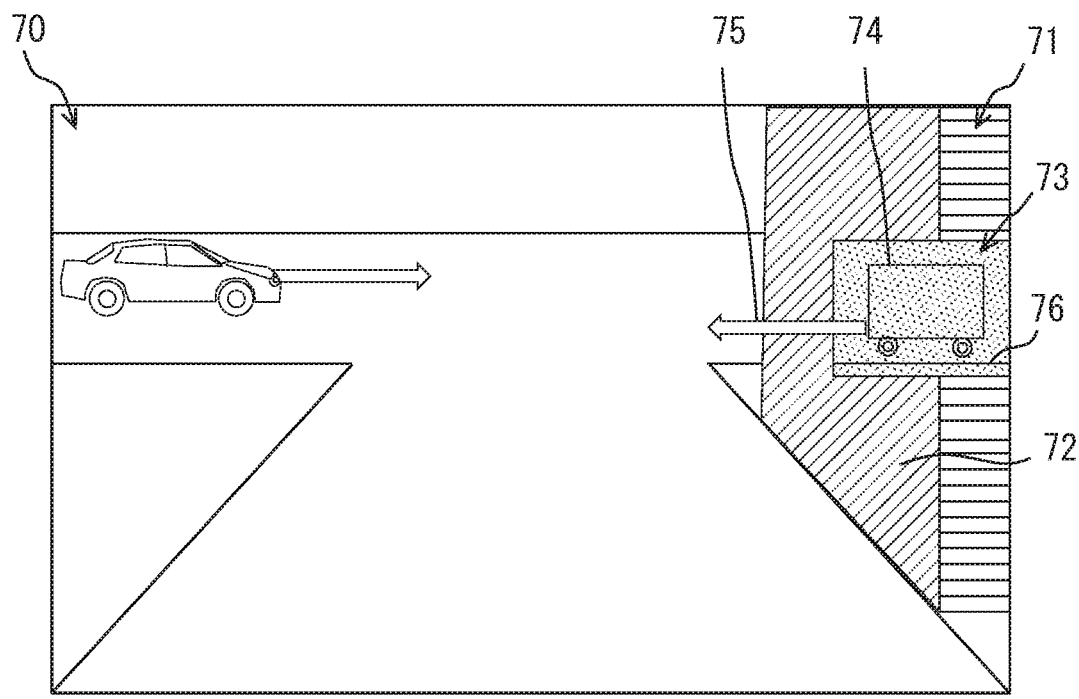
FIG. 6 is a diagram showing a periphery confirmation video image in a stage where the type of a blind spot object is difficult to identify.

In the first embodiment, when the accuracy factor of detection of the blind spot object V1 is low and the type of the blind spot object V1 cannot be identified, the video image output device 100 displays the object image 74 in which the shape is abstracted (refer to FIG. 6). According to the drawing process described above, the object image 74 showing the blind spot object V1 is displayed in an ambiguous state with low visual attractiveness, together with the transmittance kept low. Therefore, a situation can be prevented in which the type of the blind spot object V1 is erroneously determined at a stage where the accuracy factor is low, and a viewer who sees the periphery confirmation video image 70 feels uncomfortable.

Further, in the first embodiment, the background image 76 to be fitted in the image transmission region 73 is generated with the use of information acquired in real time by the front camera 21 and the detection unit 22. As described above, if the background image 76 is generated from the current information acquired at any time, even if the background cannot be imaged by the front camera 21 as in the case of the blind spot object V1, the reality of the pseudo transmission image displayed in the image transmission region 73 is maintained high.

The image processing unit 40 according to the first embodiment can use map data to generate the background image 76. Therefore, the image processing unit 40 can generate the background image 76 by incorporating information on the road shape, the structure, and the like in which the accuracy is ensured with respect to the range of the blind spot of the obstruction S1. According to the above configuration, the reality of the pseudo-transmission image displayed in the image transmission region 73 is further maintained high.

In the first embodiment, the front camera 21 corresponds to an "imaging unit", the display 30 corresponds to a "display device", and the periphery confirmation video image 70 corresponds to a "video image". The obstructions S1 and S2 correspond to a "first object" and a "obstruction", and the blind spot object V1 corresponds to a "second object".

Second Embodiment

Figure 11:
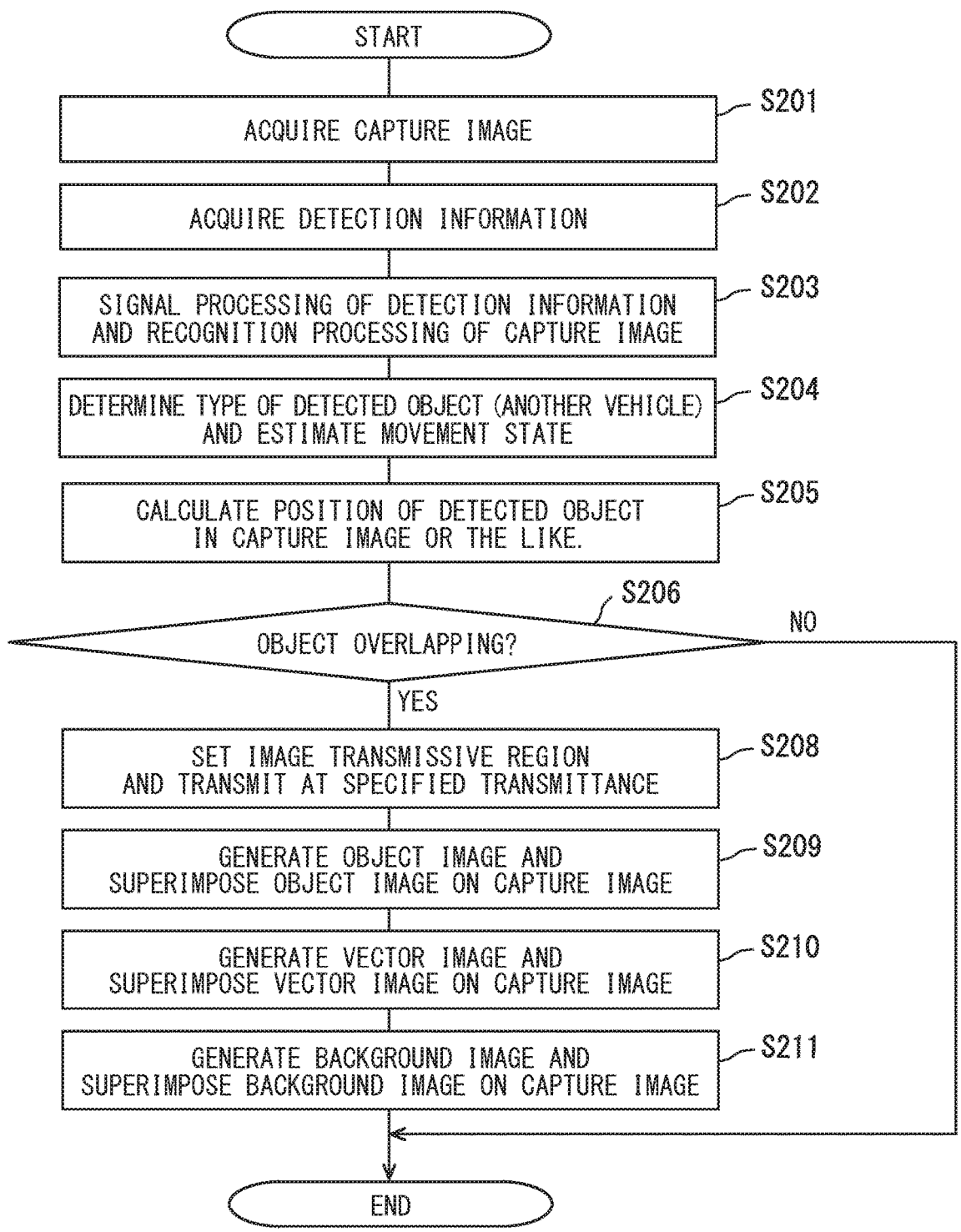
FIG. 11 is a flowchart showing details of a video image generation process according to a second embodiment.

A second embodiment shown in FIG. 11 is a modification of the first embodiment. In the video image generation process shown in FIG. 11, a process of acquiring map information and state information of a host vehicle A (refer to S104 in FIG. 7) and a process of selecting a detected object (refer to S106 and S107 in FIG. 7) are omitted. In other words, in the second embodiment, S201 and S202, and S203 and S204 correspond to S101 and S102, and S104 and S105, respectively, in the first embodiment, and S205 to S211 corresponds to S108 to S113. In addition, in S211, a background image 76 is generated without using map data. In the second embodiment described above, a periphery confirmation video image 70 as shown in FIG. 5 can be displayed, and early notification of a blind spot object V1 that exists on a far side of an obstruction S1 can be performed while the complexity of the periphery confirmation video image 70 is reduced.

Other Embodiments

Although a plurality of embodiments of the present disclosure have been described above, the present disclosure is not construed as being limited to the above-described embodiments, and can be applied to various embodiments and combinations within a range that does not depart from the spirit of the present disclosure.

The accuracy factor determination unit 61 according to Modification 1 of the above embodiment determines the accuracy factor based on the distance to the detected object (blind spot object V1) detected by the detection unit 22, instead of the number of detection times n of the detected object detected by the detection unit 22. More specifically, the accuracy factor determination unit 61 determines that the accuracy factor is higher as the distance from the host vehicle A to the blind spot object V1 is shorter. According to the determination method described above, as the blind spot object V1 existing in the blind spot range of the obstruction S1 approaches the host vehicle A, the transmittance of the image transmission region 73 in the periphery confirmation video image 70 gradually increases. According to the periphery confirmation video image 70, the accuracy of the notification of the blind spot object V1 can be enhanced.

Similar to the first embodiment, the accuracy factor determination unit 61 of Modification 2 of the above embodiment increases the accuracy factor (transmittance) with respect to an increase in the number of detection times n of the detected object. In addition, in Modification 2, the rising ratio of the accuracy factor (transmittance) to the increase in the number of detection times n is changed in accordance with the distance to the blind spot object V1, specifically, is changed to a large value in accordance with a decrease of the distance to the blind spot object V1 detected by the detection unit 22. More specifically, in a state in which the distance between objects from the host vehicle A to the blind spot object V1 is less than the approach threshold, the accuracy factor determination unit 61 switches the rising ratio of the accuracy factor (transmittance) to the increase in the number of detection times n to a larger value as compared with a case in which the distance between the objects is equal to or larger than the approach threshold.

According to the above configuration, in the stage where the blind spot object V1 is far away and the accuracy factor of detection cannot be secured, the transmittance of the image transmission region 73 is gradually increased so that the viewer hardly feels troublesome about the transmission image. On the other hand, in a stage where the accuracy of detection is secured by the approach of the blind spot object V1, the transmittance of the image transmission region 73 rises rapidly. According to the above configuration, high reliability of the notification of the blind spot object V1 by the periphery confirmation video image 70 can be ensured.

In the above embodiment, the radar, the lidar, the sonar, and the like are exemplified as the detection unit. However, the detection unit may be, for example, an on-board camera other than the front camera. Further, the detection unit may be a communication unit or the like that acquires information detected outside the host vehicle by a wireless communication or the like.

In the above embodiment, an example in which the periphery confirmation video image 70 of the front region is displayed in the vehicle moving forward has been shown. However, the periphery confirmation video image may be displayed on the display as a periphery confirmation video image in which the image transmission region is set in the obstruction image captured by a back monitor in a vehicle moving backward.

In the periphery confirmation video image of the above embodiment, the background image is further superimposed on the image transmission region. In addition, a vector image is superimposed in the vicinity of the image transmission region. The background image and the vector image may be omitted. Alternatively, the display and non-display of the background image and the vector image may be switchable by the viewer.

In the above embodiment, the functions provided by the video image output device can be provided by hardware and software different from those described above, or a combination of the hardware and the software. In addition, various non-transitory tangible storage media (non-transitory tangible storage medium) can be employed as the storage unit for storing the video image generation programs. Such non-transitory tangible storage media may be various non-volatile storage media such as a flash memory, a hard disk and an optical disk, or volatile storage media such as RAM. The storage medium is not limited to the storage unit provided in the control device such as an HCU, and may be an optical disk serving as a copy source to the storage unit, a hard disk drive of a general-purpose computer, or the like.

Here, the process of the flowchart or the flowchart described in this application includes a plurality of sections (or steps), and each section is expressed as, for example, S1. Further, each section may be divided into several subsections, while several sections may be combined into one section. Furthermore, each section thus configured may be referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An image output device that outputs a periphery image of a periphery of a vehicle to a display device in the vehicle having an imaging unit that images the periphery of the vehicle and a detection unit that is arranged on a traveling direction side of the vehicle with respect to the imaging unit and detects a plurality of objects in the periphery of the vehicle, the image output device comprising:
    an image acquisition unit that acquires a capture image of the periphery which is captured by the imaging unit;
    a detection information acquisition unit that acquires detection information of each object detected by the detection unit;
    an accuracy factor determination unit that determines an accuracy factor of detection of each object based on the detection information;
    a position calculation unit that calculates a position of each object in the capture image based on the detection information;
    an overlap determination unit that determines whether objects overlap with each other in the capture image based on a calculation result of the position calculation unit; and
    an image processing unit that:
        sets an image transmission region in at least a part of a region in which a first object is to be displayed, the first object being disposed on a near side of the vehicle among the objects determined to overlap with each other in the capture image;
        generates the periphery image in which a second object disposed on a far side of the vehicle with respect to the first object is visible; and
        changes a transmittance defined in the image transmission region to be higher as the accuracy factor of the detection of the second object becomes higher.

2. The image output device according to claim 1, wherein:
    the detection information acquisition unit acquires position information of the object detected by the detection unit, which includes at least one of a radar, a lidar, and a sonar, as the detection information; and
    the position calculation unit calculates the position of the object in the capture image based on the position information.

3. The image output device according to claim 2, wherein:
    the accuracy factor determination unit determines the accuracy factor to be higher as a numerical number of detection times of the second object detected by the detection unit increases.

4. The image output device according to claim 3, wherein:
    the image processing unit changes a rising ratio of the transmittance with respect to an increase of the numerical number of detection times to be larger as a distance to the second object detected by the detection unit decreases.

5. The image device according to claim 2, wherein:
    the accuracy factor determination unit determines the accuracy factor to be higher as a distance to the second object detected by the detection unit decreases.

6. The image output device according to claim 1, further comprising:
    an object tracking unit that tracks the second object based on the detection information and calculates a moving direction of the second object, wherein:
    the image processing unit displays a vector image indicating the moving direction of the second object on the periphery image.

7. The image output device according to claim 6, further comprising:
    an approach determination unit that determines whether the second object approaches the vehicle based on a tracking result of the object tracking unit, wherein:
    the image processing unit controls the image transmission region of the first object overlapping with the second object to be transmissive only when the second object approaches the vehicle.

8. The image output device according to claim 7, further comprising:
    a movement estimation unit that estimates a future movement path of the vehicle based on state information indicating a movement state of the vehicle, wherein:
    the object tracking unit estimates a future movement path of the second object based on a tracking result of the second object; and
    the image processing unit controls the image transmission region of the first object overlapping with the second object to be transmissive only when the future movement path of the vehicle and the future movement path of the second object intersect with each other.

9. The image output device according to claim 6, wherein:
    the image processing unit changes a display feature of the vector image in accordance with a movement state of the second object calculated by the object tracking unit.

10. The image output device according to claim 6, wherein:
    the object tracking unit estimates a current position of a tracked object based on a tracking history when the detection information indicating the tracked object is not acquired due to an obstruction disposed between the vehicle and the tracked object; and
    the image processing unit sets the image transmission region, in which the transmittance is defined, at the current position of the tracked object estimated by the object tracking unit, and generates the periphery image in which the tracked object disposed on a far side of the obstruction is visible.

11. The image output device according to claim 10, wherein:
the image processing unit decreases the transmittance of the image transmission region as an elapsed time increases after the detection information indicating the tracked object is not acquired.

12. The image output device according to claim 1, further comprising:
an object identification unit that identifies a type of the second object based on the detection information, wherein:
the image processing unit superimposes an object image, corresponding to an identification result of the object identification unit, on the image transmission region.

13. The image output device according to claim 12, wherein:
the image processing unit superimposes an abstracted object image on the image transmission region when the type of the second object is not determined by the object identification unit.

14. The image output device according to claim 1, wherein:
the image processing unit generates a background image providing a background of the second object based on at least one of the capture image and the detection information, and superimposes the background image on the image transmission region.

15. The image output device according to claim 1, further comprising:
a map information acquisition unit that acquires map data of a region in the capture image, wherein:
the image processing unit generates a background image providing a background of the second object based on the map data, and superimposes the background image on the image transmission region.

16. A non-transitory tangible computer-readable storage medium including instructions for causing a computer to function as an image output device for generating a periphery image of a periphery of a vehicle to be output to a display device in the vehicle having an imaging unit that images the periphery of the vehicle and a detection unit that is arranged in a traveling direction side of the vehicle with respect to the imaging unit and detects a plurality of objects in the periphery of the vehicle, the instructions comprising:
acquiring a capture image of the periphery which is captured by the imaging unit;
acquiring detection information of each object detected by the detection unit;
determining an accuracy factor of detection of each object based on the detection information;
calculating a position of each object in the capture image based on the detection information;
determining whether the objects overlap with each other in the capture image based on a calculation result of the calculating of the position of each object;
setting an image transmission region in at least a part of a region in which a first object is to be displayed, the first object being disposed on a near side of the vehicle among the objects determined to overlap with each other in the capture image;
generating the periphery image in which a second object disposed on a far side of the vehicle with respect to the first object is visible; and
changing a transmittance defined in the image transmission region to be higher as the accuracy factor of the detection of the second object becomes higher.

17. An image output device that outputs a periphery image of a periphery of a vehicle to a display in the vehicle having an imager that images the periphery of the vehicle and a detector that is arranged on a traveling direction side of the vehicle with respect to the imager and detects a plurality of objects in the periphery of the vehicle, the image output device comprising:
a processor configured to:
acquire a capture image of the periphery which is captured by the imager;
acquire detection information of each object detected by the detector;
determine an accuracy factor of detection of each object based on the detection information;
calculate a position of each object in the capture image based on the detection information;
determine whether the objects overlap with each other in the capture image;
set an image transmission region in at least a part of a region in which a first object is to be displayed, the first object being disposed on a near side of the vehicle among the objects determined to overlap with each other in the capture image;
generate the periphery image in which a second object disposed on a far side of the vehicle with respect to the first object is visible; and
change a transmittance defined in the image transmission region to be higher as the accuracy factor of the detection of the second object becomes higher.

* * * * *